May 16, 1967  H. R. PAYNE  3,319,821
PLURAL SOURCE ARTICLE DISPENSER WITH SEPARATE
DISCHARGE MEANS FOR EACH SOURCE
Filed Feb. 7, 1966  6 Sheets-Sheet 1

INVENTOR
HARRY R. PAYNE

BY Cameron, Kerkam & Sutton
ATTORNEYS

Fig. 2

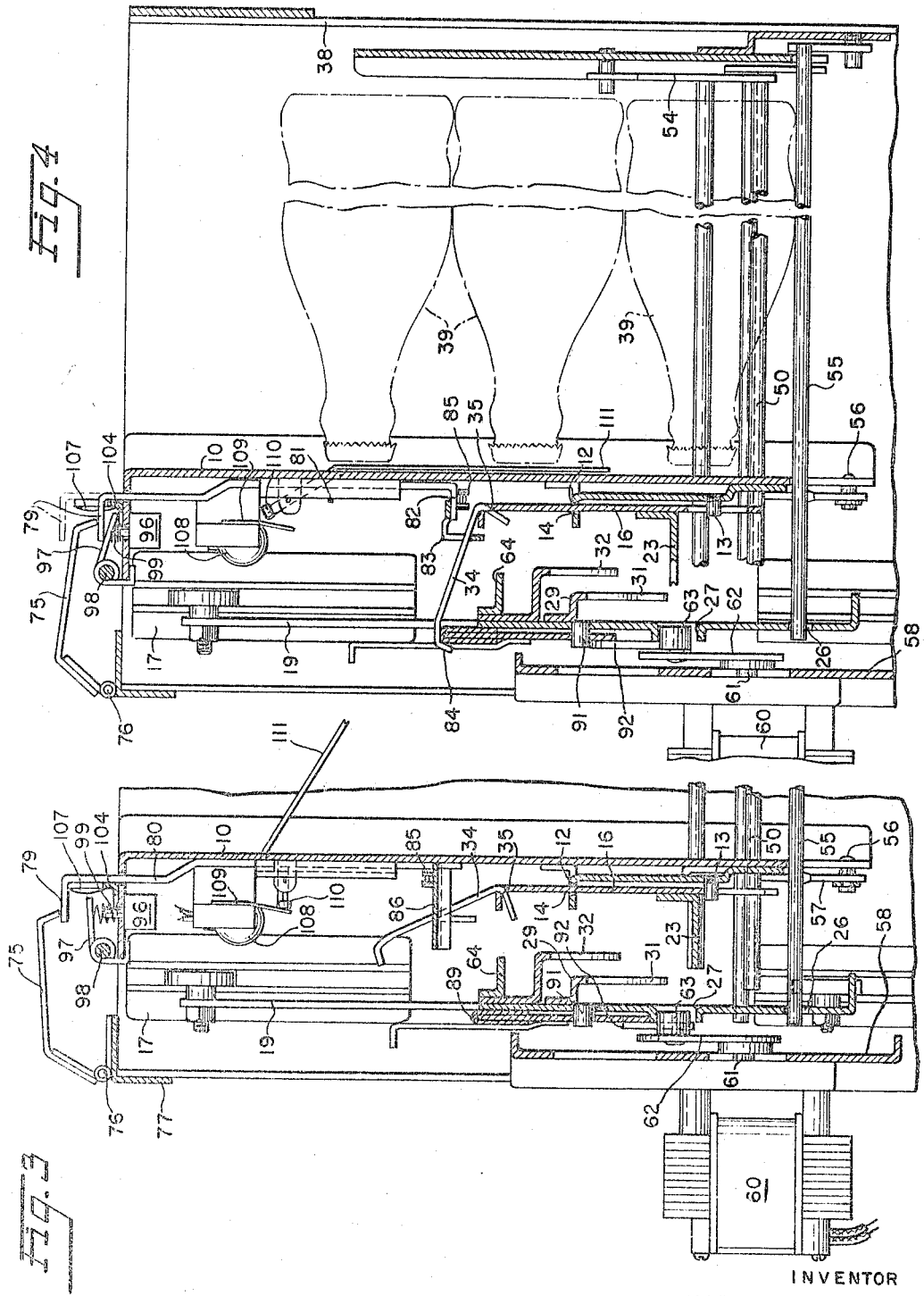

INVENTOR
HARRY R. PAYNE
BY Cameron, Kerkam & Sutton
ATTORNEYS

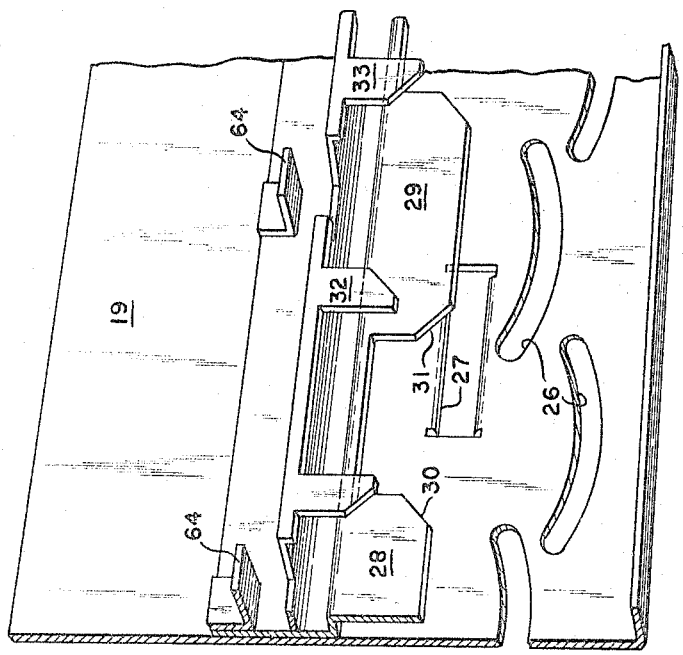
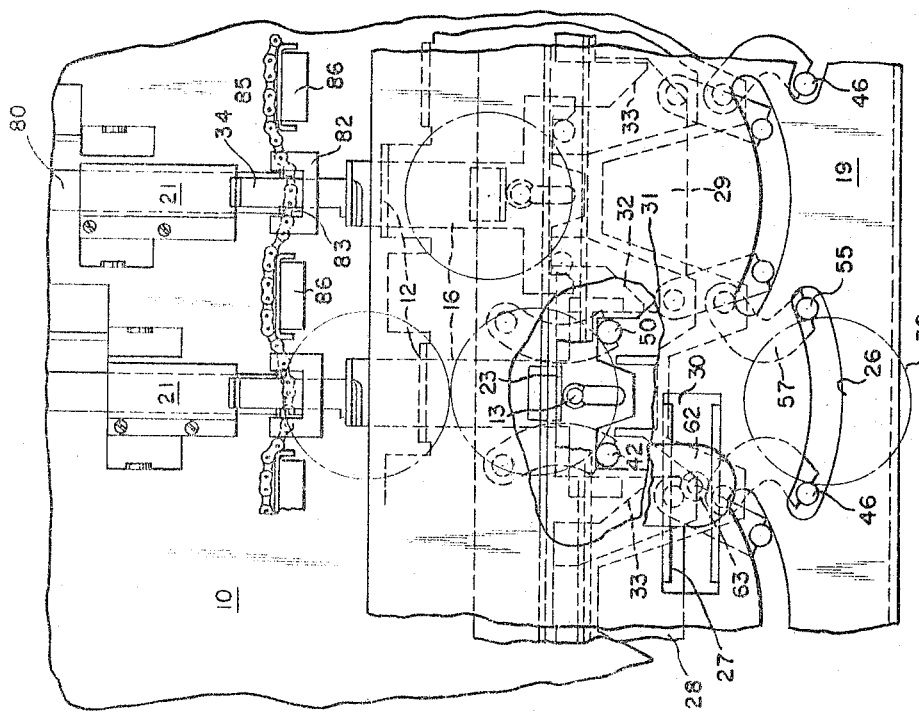

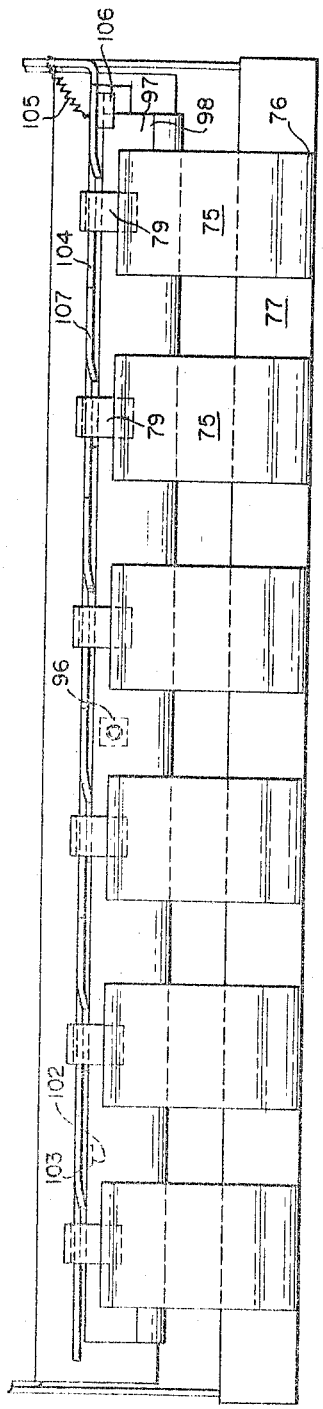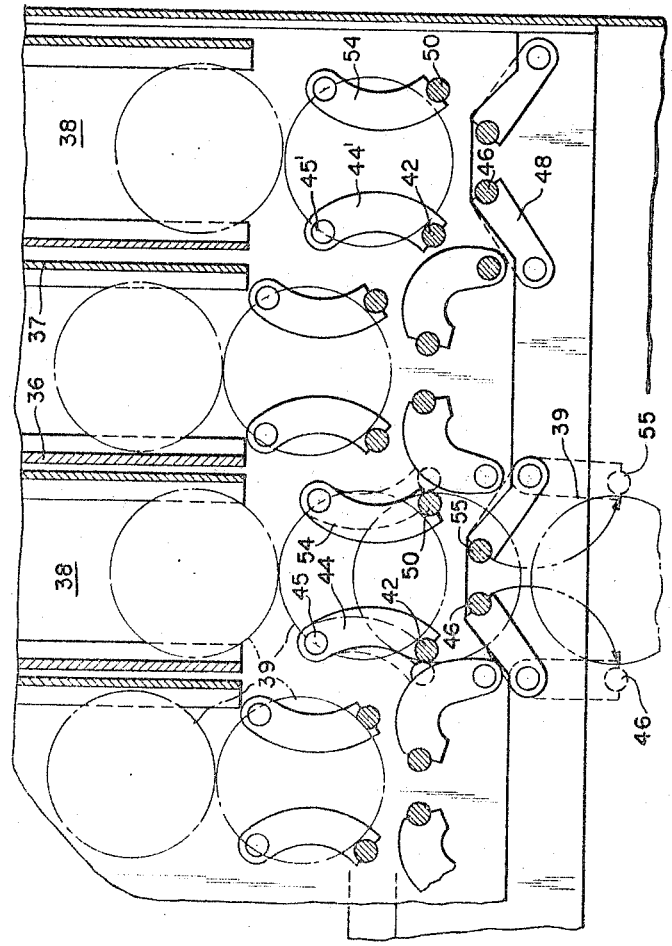

United States Patent Office 3,319,821
Patented May 16, 1967

3,319,821
PLURAL SOURCE ARTICLE DISPENSER WITH SEPARATE DISCHARGE MEANS FOR EACH SOURCE
Harry R. Payne, Chattanooga, Tenn., assignor to The Seeburg Corporation, Chicago, Ill., a corporation of Delaware
Filed Feb. 7, 1966, Ser. No. 525,470
10 Claims. (Cl. 221—125)

United States Patent No. 3,175,728 to James C. Lindsey and Frank A. McRoy, dated Mar. 30, 1965, discloses a cam plate dispensing mechanism and the copending application for patent filed by Frank A. McRoy on Mar. 17, 1965, Ser. No. 440,449, now U.S. Patent No. 3,260,407, relates to such mechanisms having a positively driven cam plate, both being owned by the assignee herein.

The present invention relates to direct select mechanisms useful with these known devices for dispensing articles one at a time from a vertical stack of articles.

For particularly this invention relates to mechanisms for dispensing one article at a time from a vertical stack of articles in which after deposit of a coin, a selector link is manually depressed closing an electric motor circuit and dropping a lock release arm for the selected stack of articles. Rotation of the electric motor then raises a lock release plate to engage and raise the dropped lock release arm to release a pair of support rods which move to permit the article to rest upon lowering rods. The motion of the lowering rods is provided by continued rotation of the motor positively driving a cam plate mechanism. The lowering rods in their driven downward movement are followed by cams on the positively driven cam plate which return the support rods to their initial position beneath the next article in the stack of articles before the first article is dispensed. "Jack-potting" of the machine is prevented by the positive drive the cam plate so that the lowering rods are always returned to their upper position; by a chain lock-out device preventing actuation of more than one selector link at a time; and by a solenoid actuated locking device.

Heretofore, various mechanisms have been proposed for dispensing one article at a time from a vertical stack of articles, such articles being bottles, cans, cartons, and the like, hereinafter referred to for convenience as bottles. In the prior devices referred to above the bottle after release is positively moved at controlled speed to a position accessible to the user of the mechanism. However, these devices require costly electric circuitry and mechanical direct select mechanism is desirable for purposes of economy and for durability of the mechanism under all conditions of use.

The present dispensing mechanism dispenses but one bottle at a time from a vertical stack of bottles using mechanical direct select mechanism and may include a positively driven cam plate dispensing mechanism, while preventing removal of more than one bottle at a time from the mechanism, and positively controls the downward movement of the released bottle so that the same is delivered to position accessible to the user of the mechanism with minimum free fall and without damage to the bottle.

It is therefore an object of the present invention to provide a novel mechanical direct select mechanism for use with a cam plate mechanism for dispensing a single bottle at a time from a vertical stack of bottles in which a lock plate is moved by the direct select mechanism through a motor driven lock release plate, after deposit of a coin, to release bottle support rods which move to permit the bottle to rest upon bottle lowering rods. Downward movement of the lowering rods is provided by a cam plate driven by the motor so that the bottle moves to dispensing position at a controlled rate, the downward movement of the lowering rods being followed by cams on the cam plate to cam the bottle support rods to position beneath the next bottle in the stack and to lock the bottle support rods under this next bottle until the lock plate returns to locking position thus preventing "jack-potting" of the mechanism.

Another object of the present invention is to provide such a mechanical direct select mechanism for use with a cam plate dispensing mechanism in which the movement of the lowering rods is positively provided by a positively driven cam plate receiving the lowering rods. The cam plate carries a lock release plate raised by motor means to release the support rods. The cam plate is then progressively lowered during the dispensing cycle to permit the lowering rods to move to dispensing position. The cam plate is then positively driven upward to return the lowering rods to their upper stand-by position and to raise the lock release plate to normal stand-by position.

Another object of the present invention is to provide a positively driven cam plate dispensing mechanism slidably mounting a lock release plate actuated by the motor driving the cam plate in which, adjacent upper dead center of the cam plate, the lock release plate is raised to release the support rods from the lock plate and the positively driven downward movement of the cam plate returns the lock plate to its normal position to lock the bottle support rods in bottle supporting position.

Another object of the present invention is to provide a mechanical direct select mechanism for a cam plate dispensing mechanism in which the cam plate is positively driven during its entire cycle of movement first upwardly to upper dead center with further upward movement of the lock release plate mounted thereon and then downwardly to bottle dispensing position and upwardly therefrom to return the lowering rods to their normal position with return of the lock release plate to normal position employing mechanical connecting means between the lock plate for the support rods and the lock release plate which connecting means are manually and selectively moved into operative position.

Another object of the present invention is to provide a mechanical direct select mechanism for a cam plate dispensing mechanism which is positive and certain in its operation; which is reasonably inexpensive to manufacture and to maintain; and which is suitable for use with each of a plurality of vertical side by side stacks of bottles in a dispenser, the cam plate mechanism for the lowering rods and the lock release plate then being common to all of the mechanisms.

Another object is to provide a lock-out chain device for use with the direct select mechanisms of the present invention for a plurality of vertical side by side stacks of bottles to prevent the actuation of more than one direct select mechanism at a time.

Another object is to provide a positively actuated lock energized when the motor is energized to hold a common actuator bar in switch actuating position to maintain the motor circuit closed for a predetermined time and at the same time to lock the selected push rod in downward position while blocking movement of any other push rods thus providing additional safety features preventing the dispensing of more than one battle at a time.

Other and further objects of the present invention will appear from the following description of an illustrative embodiment thereof.

The present invention is capable of various mechanical embodiments, a preferred embodiment being shown in the accompanying drawings and is described hereinafter to illustrate the invention as applied to the positive drive cam plate mechanism of application Ser. No. 440,449. This illustrative and preferred embodiment should not be construed as defining or limiting the invention since the invention may be used with any dispensing mechanism employing bottle support rods and controlled bottle lowering rods.

In the accompanying drawings, in which like reference characters indicate like parts, FIG. 1 is a front view of an illustrative and preferred embodiment of the cam plate dispensing mechanism of the present invention showing the drive motor support plate partially cut away to show the cam plate; the lowering rods; and the lock release plate mounted thereon for two stacks of bottles at the right of the figure, a plurality of stacks of bottles being shown in side by side relationship with a dispensing mechanism and a direct select mechanism for each stack disposed above the dispensing mechanism together with the lock-out chain structure;

FIG. 2 is a view similar to that of FIG. 1 with the motor support plate removed and the cam plate and lock release plate cut away in part to show the structure behind it;

FIG. 3 is a sectional view on the line 3—3 of FIG. 2 with the latch plate in locking position; the support rods in bottle support position; the cam plate adjacent upper dead center; and the lock release arm in upper posiiton, all in stand-by position;

FIG. 4 is a view in section of the embodiment of FIG. 2 on the line 4—4 thereof with the lock release arm for the latch plate dropped for engagement by the lock release plate prior to release of the support rods to drop the lowermost bottle on the lowering rods;

FIG. 7 is a view similar to that of FIG. 5 showing the mechanism of the left stack in bottle dispensing position;

FIG. 8 is a perspective view of the cam surfaces and lowering rod slots in the cam plate of FIG. 1 showing the slot receiving the drive roller for positively driving the cam plate;

FIG. 9 is a partial cross-sectional view looking toward the rear of the mechanism; and FIG. 10 is a view from above of the selector links, the common actuator bar, the tops of the selector push rods and the positive actuator lock.

Figure 1:
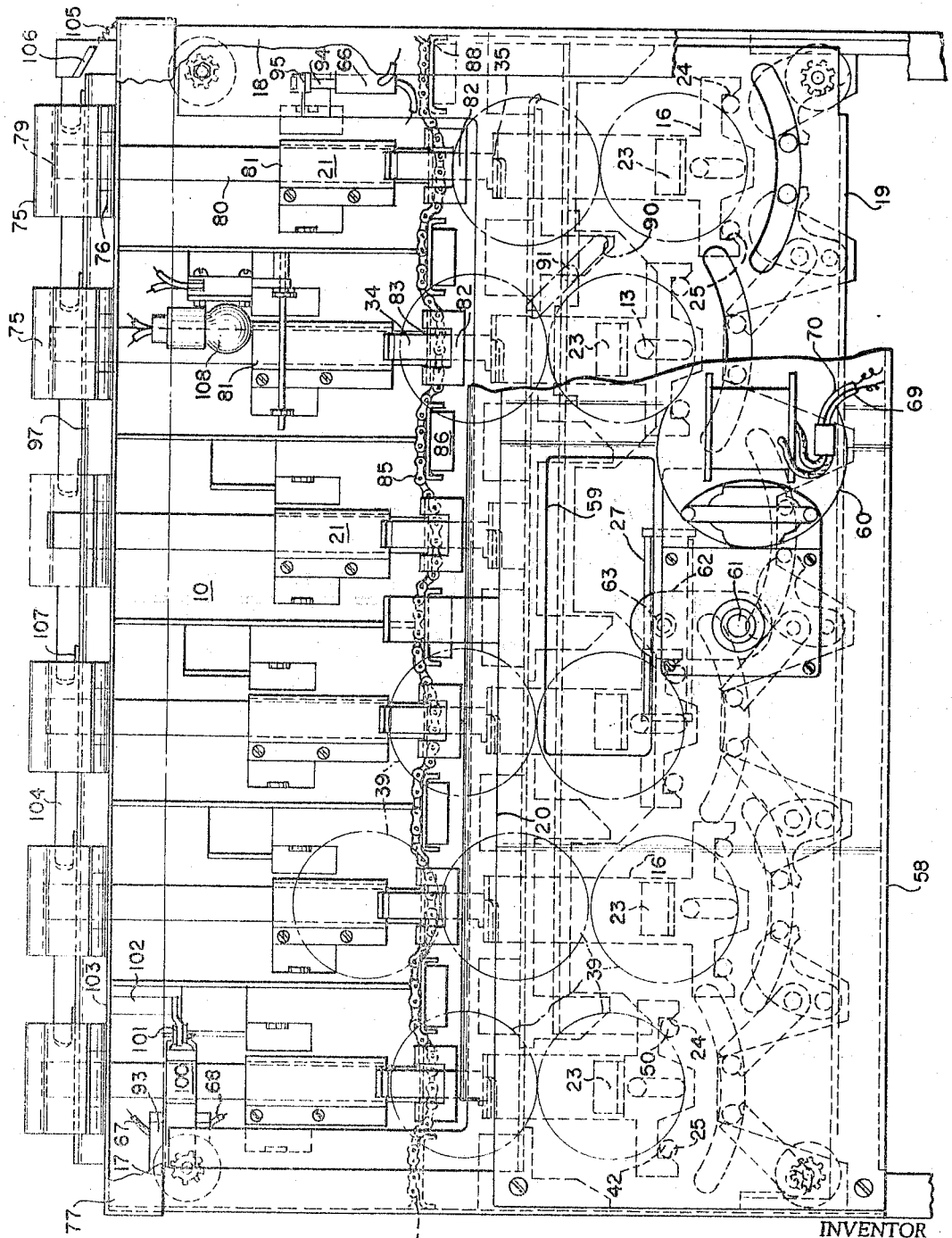

Referring now to the several figures, the mechanism is provided with a face plate or front wall 10 of suitable width to accomodate as many stacks of bottles as may be desired, six such stacks of bottles being shown but more or fewer stacks can be utilized. The stacks and mechanism for each stack are here shown alternately staggered vertically for compactness and so that the mechanism of adjacent stacks will not interfere. Front wall 10 is provided wtih upper forwardly extending flange 12 and lower forwardly extending pin 13 for each stacks of bottles (FIGS. 3 and 4), flange 12 being suitably slotted at 14 to slidably receive lock plate 16 which slides on pin 13. Tracks 17 and 18, mounted in front of plate 10, receive cam plate 19. Cam plate 10 is cut away at 20 to expose the direct select mechanisms generally indicated at 21 which are mounted on front wall 10. Cam plate 19 is spaced from mechanisms 21 so that both cam plate 19 and lock plates 16 can reciprocate vertically. Lock plate 16 is provided with shoulder 23 and is further provided with spaced shoulders 24 and 25 for purposes which will hereinafter be described. Cam plate 19 is slotted at 26 (FIG. 8) as will be more fully described hereinafter and has horizontal slot 27 for the driving motor roller. Downwardly extending portions 28 and 29 are mounted on and are spaced from plate 19 (FIG. 8). Portion 28 is provided with cam surface 30 and portion 29 is provided with cam surface 31. Also mounted on plate 19 and spaced therefrom are downwardly extending portions 32 and 33 providing cam surfaces for the support rods of the next stack, all for purposes more fully described hereinafter.

Direct select mechanisms 21 are provided with lock release arms 34 which are loosely connected at 35 to lock plates 16.

Figure 2:
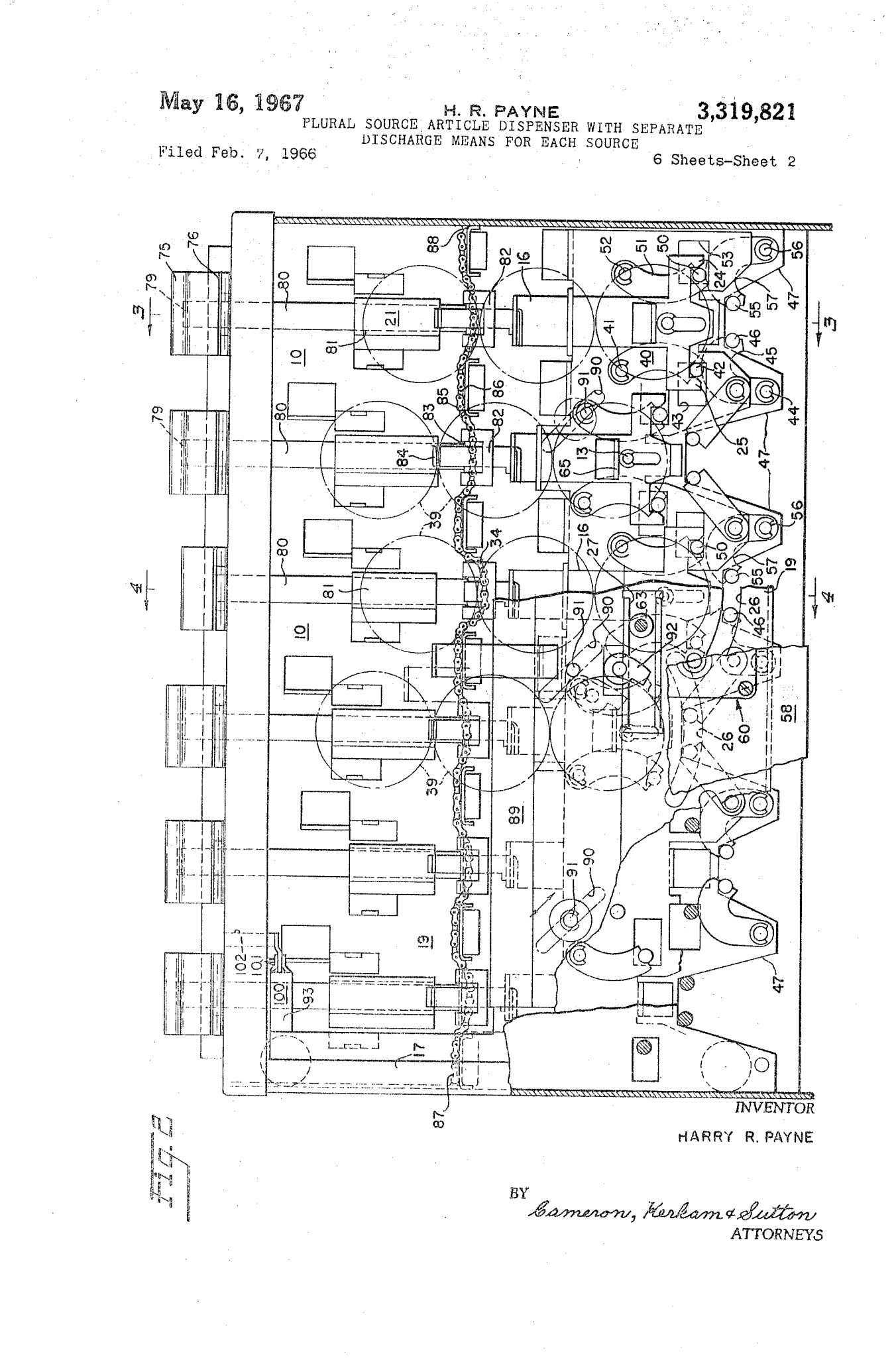

Suitable partitions 36 and 37 (FIGS. 5 and 6) are mounted between front wall 10 and back wall 38 (FIG. 9) to provide a bin for the bottles in vertical stack, the bottles being generally indicated at 39 (FIG. 4). For each stack of bottles, an arm 40 is pivotally mounted at 41 on the front of wall 10 and support rod 42 passes through and is secured to an end thereof. Rod 42 extends through an opening 43 in wall 10 to rear wall 38 where it is secured to arm 44' which is pivoted to wall 38 at 45' (FIG. 9). Arm 42 can therefore swing from its position as shown in FIG. 2 in clockwise movement to the position shown in FIGS. 5 and 6.

An arm 45 is mounted on pivot 44 and receives and holds lowering rod 46. Rod 46 passes through wall 10 and is aranged for downward clockwise rotary movement in opening 47 therein. Rod 46 extends to back wall 38 and is secured to arm 48 which in turn is pivotally mounted thereon. Lowering rod 46 is extended to pass through and for engagement in the adjacent slot 26 in cam plate 19.

A second support rod 50 is mounted opposite support rod 42. An arm 51 supports rod 50 and is pivoted to front wall 10 at 52. Rod 50 extends through front wall 10 in opening 53. Rod 50 extends to rear wall 38 where it is provided with an arm 54 similar to arm 44 which arm 54 is in turn pivoted to back wall 38.

A second lowering rod 55 is mounted opposite lowering rod 46 and extends through adjacent slot 26 in cam plate 19 and through opening 47 in wall 10. Rod 55 is supported by arm 57 which is pivotally mounted on pivot 56. Rod 55 extends to rear wall 38 where it is supported by an arm similar to arm 48 which in turn is pivotally mounted on rear wall 38.

A motor support plate 58 is secured to the front of tracks 17 and 18. Plate 18 is cut away at 59 and a suitable electric motor 60 is mounted thereon adjacent opening 59. Motor 60 drives shaft 61 carrying arm 62 which in turn supports roller 63 which is received in horizontal slot 27 in cam plate 19. Energization of motor 60 rotates arm 62 and arm 62 acting through roller 63 in slot 27 positively moves cam plate 19 vertically in tracks 17 and 18 from an upper stand-by position to a lower bottle dispensing position and return to stand-by position. Lowering rods 46 and 55 are therefore retained in upper position by plate 19 and motor 60 in turn holds cam plate 19 in upper position as seen in FIG. 1.

Each direct select mechanism generally indicated at 21 includes a selector link 75 hinged at 76 to cross frame member 77. Link 75 is turned down at 78 to engage head 79 of push rod 80, rod 80 being slidably mounted in bracket 81 secured to wall 10. Push rod 80 is turned at its lower end 82 and slotted at 83 to receive lock release arm 34. Arm 34 has hook-shaped end 84 as will be more fully explained hereinafter.

Lock-out chain 85 extends beneath the several ends 82 and over chain supports 86 mounted on wall 10 and is secured at its ends 87 and 88 to the side walls of the mechanism. Chain 85 has sufficient slack to allow only push rod 80 to be depressed sufficiently to drop the associated lock release arm 34 to position shown in FIG. 4 for reasons to be described more fully hereinafter.

A lock release plate 89 is slidably mounted on cam plate 19 by slots and pins 90 and 91 and has cam finger 92 secured thereto and normally overlying slot 27 for engagement by roller 63. When roller 63 raises cam plate 19 to adjacent upper dead center, roller 63 will then engage cam finger 92 and raise lock release plate 89 upwardly above cam plate 19 and into engagement with hooked end 84 of lock release arm 34, as seen in FIG. 4, raising lock plate 16 and releasing support rods 42 and 50.

As indicated above, the present mechanism is particularly suitable for coin actuation whereby upon the deposit of a suitable coin a single bottle is dispensed from the selected stack of bottles. Any suitable and well known type of coin-receiving mechanism can be employed which upon deposit of the coin supplies current to an electric circuit in known manner. A selector link 75 then being depressed closes the electric circuit through switch 96 and through wires 67 and 68 to solenoid 93 and at the same time energizes electric motor 60 through leads 69 and 70, solenoid 93 being deenergized after partial rotation of motor 60 and after release of the support rods. Electric motor 60, upon energization, makes but one complete revolution of arm 62 in counterclockwise rotation as seen in FIG. 1 from the position shown in FIG. 1 moving cam plate 19 through bottle dispensing position shown in FIG. 7 and return to the position, rotation of motor 60 being terminated by the opening of limit switch 66, mounted on the side frame of the mechanism, by arm 94 engaging cam surface 95 on cam plate 19.

Switch 96 is provided with a common actuator bar 97 extending full length beneath selector links 75. Bar 97 is hinged at 98 to the top of the mechanism and engages switch 96 when depressed against the action of spring 99. Thus, depression of any selector link 75 will close switch 96 and start the dispensing cycle.

Solenoid 93 has armature 100 connected at 101 to link 102 which is connected at 103 to positive actuator lock 104 which is mounted for reciprocation beneath heads 79 of push rods 80 and is returned to normal position when solenoid 93 is deenergized by spring 105. Lock 104 has a cam surface 106 secured thereto and riding over common actuator bar 97 when in depressed position to hold switch 96 closed.

Actuator lock 104 is provided with a hook portion 107 for each push rod 80. When solenoid 93 is actuated lock 104 is drawn to the left as seen in FIGS. 1 and 2 and portions 107 will move under heads 79 for the push rods 80 which have not been actuated thus preventing actuation and the hook portion 107 for the actuated push rod 80 will ride over its head 79 locking that push rod in lowered position thus, in combination with chain 85, preventing actuation of more than one direct select mechanism 21 at a time and thus dispensing but one bottle for each cycle of the dispensing mechanism.

A sold-out light 108 for each stack of bottles is connected into the electric circuitry to illuminate when the bottles of a stack are sold out. Light 108 is energized by switch 109 which is closed by arm 110 which is spring urged into the position shown in FIG. 3 when the last bottle 39, as it is dispensed, frees arm extension 111.

Figure 5:
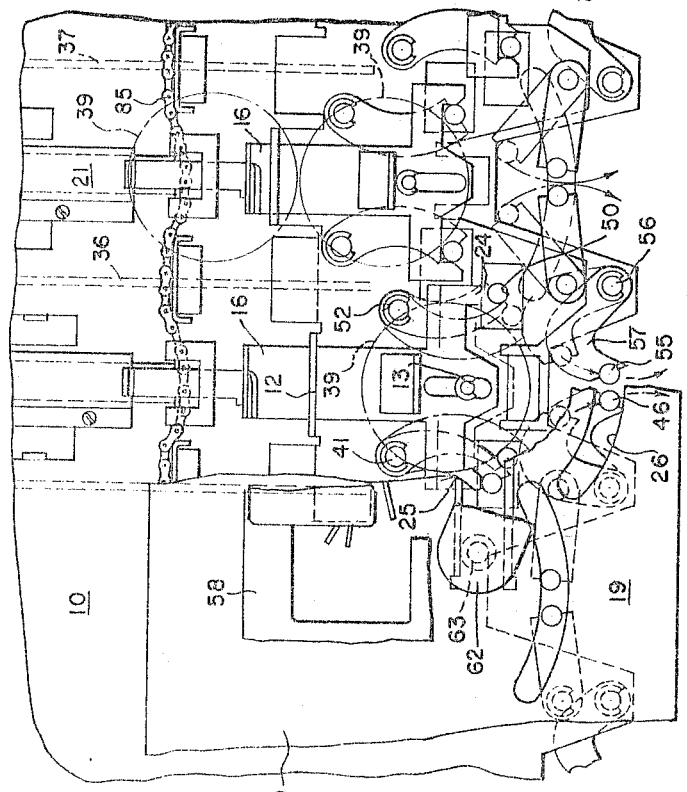
FIG. 5 is an enlarged view of a portion of FIG. 2 with the left latch plate lifted; the support rods thereof withdrawn; and the cam plate and lowering rods moved partially downward.
Figure 6:
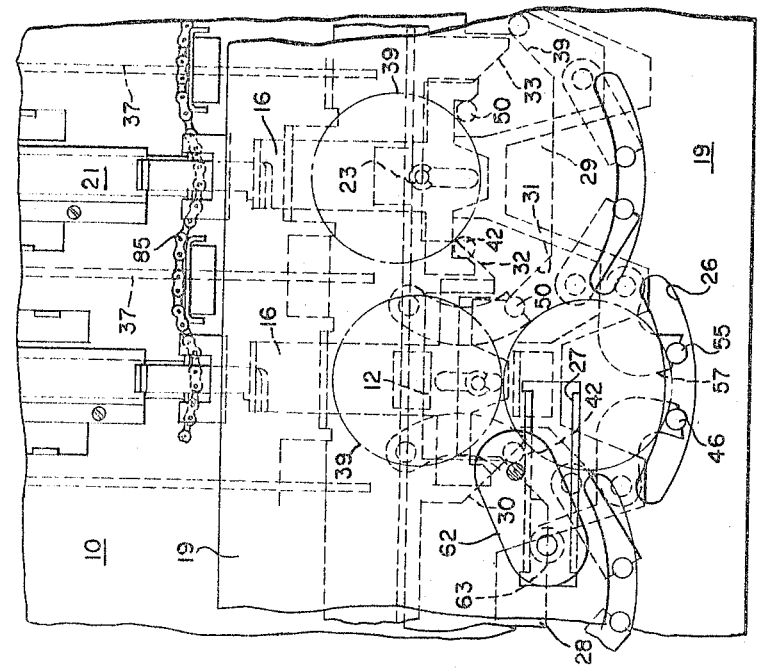
FIG. 6 is a view similar to that of FIG. 5 with the cam plate in further partially lowered position just prior to moving the support rods of the left stack back to their initial position and to lock them there, with the lowering rods approaching bottle dispensing position.

Assuming now that the embodiment of the present invention as shown in the drawings is in stand-by position as seen in FIG. 1 with support rods 42 and 50 of the third stack from the right locked in position by shoulders 24 and 25 of lock plate 16 and with lowering rods 46 and 55 engaged in slot 26 and raised to their upper position by cam plate 19 (FIGS. 5, 6 and 7). When a coin is deposited and selector link 75 for this stack is depressed, switch 96 is closed, solenoid 93 is energized moving lock bar to the left and starting motor 60. Roller 63 then moves through top dead center of cam plate 19 and thereafter engages cam finger 92 and raises lock release plate 89 for engagement with lock release arm 34 which in turn, raises lock plate 16. Lock release arm 34 in the meantime has taken the position shown in FIG. 4 because push rod 80 has been depressed. Shoulders 24 and 25 of lock plate 16 then disengage from rods 50 and 42 and rods 50 and 42 move away from each other and beneath cam surfaces 30 and 31 of elements 28 and 29. Movement apart of rods 50 and 42 permits bottle 39 to move downwardly onto lowering rods 46 and 55. Lock plate 16 cannot return to its lower locking position since it is resting upon rods 42 and 50. This portion of the cycle of the mechanism is seen in FIG. 5, it being particularly noted in FIG. 5 that plate 16 rests on rods 42 and 50.

Motor 60 continues rotation of arm 62, solenoid 93 being deenergized shortly after rotation of motor 65 begins. Since cam plate 19 supports lowering rods 46 and 55 in slot 26, lowering rods 46 and 55 can move downwardly only as cam plate 19 moves downwardly. As lowering rods 46 and 55 descend they are maintained in parallel relationship by slot 26 in cam plate 19. By reason of engagement of rods 46 and 55 in slot 26, cam plate 19 drives rods 46 and 55 downwardly. Movement of cam plate 19 downwardly brings cam surfaces 30 and 31 into engagement with support rods 50 and 42, respectively. This stage of the cycle of operation of the present mechanism is seen in FIG. 6 where rods 50 and 42 have been engaged by the cam surfaces 30 and 31, respectively, for movement toward their initial positions. Further downward movement of cam plate 19 as arm 62 is rotated moves rods 50 and 42 to their initial positions and beneath the next bottle 39 in the stack. As rods 50 and 42 move from beneath the shoulders on lock plate 16, lock plate 16 is moved downwardly by bracket 64 on plate 19 engaging shoulder 23 on lock plate 16 so that shoulders 24 and 25 engage behind rods 50 and 42, respectively, to lock them in position and prevent release of the next bottle 39. This stage of the cycle of the mechanism is shown in FIG. 6.

"Jack-potting" of the machine is prevented by the positive drive of lock plate 16 to lock position; by chain 85 which prevents more than one push rod 80 from being depressed to position to release lock release arm 34; and by lock bar 104.

It should also be noted from FIG. 6 that lowering rods 45 and 55 are now moved apart in slot 26 preparatory to dispensing bottle 39 resting thereon.

Further rotation of arm 62 permits rods 46 and 55 to move further apart in slot 26 by reason of the weight of bottle 39 thereon when cam plate 19 is driven to its lowermost position as seen in FIG. 7. When rods 46 and 55 approach the ends of slot 26 bottle 39 resting on rods 46 and 55 passes between them and moves to dispensing position. At this time in the cycle of operation of the mechanism arm 62 has performed approximately one-half a revolution.

Continuing rotation of arm 62 now raises cam plate 19 and with it lock release plate 89. Cam plate 19 engaging rods 46 and 55 in slot 26, lift them upwardly and move them toward each other in slot 26. Cam plate 19 continues in upward movement until elements 28 and 29 are raised above support rods 42 and 50 so that rods 42 and 50 are locked in position only by shoulders 24 and 25, respectively, of lock plate 16. Further upward movement of cam plate 19 moves cam surfaces 30 and 31 above rods 50 and 42, respectively until arm 62 reaches its upper position. Switch 66 is then opened by cam surface 95 on cam plate 19 at which point energization of motor 60 terminates. The mechanism is now in stand-by position and ready for the next cycle of operation.

It should now be apparent that the present invention in every way satisfies the objectives discussed above.

Changes in or modifications to the above-described illustrative embodiment of the present invention may now be suggested to those skilled in the art without departing from the present inventive concept. Reference should therefore be had to the appended claims to determine the scope of this invention.

What is claimed is:

1. A direct select mechanism for a dispenser having a bin for articles in vertical stack, a pair of support rods movably mounted beneath the lowermost article in the bin, a pair of lowering rods beneath the support rods, a lock plate in restraining engagement with the support rods, and motor means for actuating the lowering rods comprising means for moving the lock plate out of restraining engagement with the support rods for movement of the support rods including a lock release arm connected to the lock plate, a push rod, an end on said push rod loosely embracing said arm and holding said arm against gravitational movement, a lock release plate mounted for reciprocating movement, the motor means moving said lock release plate, and a movable selector link engaging said push rod whereby when said selector link is moved said push rod is moved and said lock release arm is freed for gravitational movement and for engagement by said lock release plate and said lock release plate releases the support rods.

2. Mechanism as described in claim 1, the dispenser including a cam plate positively driven by the motor means from an upper position to a lower position and return to upper position and engaged by the lowering rods, said lock release plate being mounted for movement on and with respect to the cam plate.

3. Mechanism as described in claim 2, the motor means being an electric motor having an arm received in a horizontal slot in the cam plate, the arm engaging said lock release plate for movement thereof when the cam plate is adjacent its upper position.

4. A direct select mechanism for a dispenser having a plurality of bins for articles in vertical stack in side by side relation, a pair of support rods movably mounted beneath the lowermost article in each of the bins, a pair of lowering rods beneath each pair of the support rods, a lock plate in restraining engagement with each pair of the support rods and motor means actuating all of the lowering rods comprising means for each of the lock plates for moving the lock plate out of restraining engagement with the associated pair of support rods for movement of the support rods including for each of said means a lock release arm connected to the lock plate, a push rod loosely embracing said arm and holding said arm against gravitational movement, a lock release plate mounted for reciprocating movement by the motor means, and a movable selector link for each of said rods whereby when one of said selector links is moved the associated one of said push rods is moved and the associated one of said lock release arms is freed for gravitational movement and for engagement by said lock release plate and the associated lock plate releases the associated pair of support rods.

5. Mechanism as described in claim 4 including flexible non-extensible means engaged by said push rods permitting complete movement of one of said push rods at a time.

6. Mechanism as described in claim 4, the dispenser having a cam plate positively driven by the motor means from an upper position to a lower position and return to the upper position and engaged by the lowering rods, said lock release plate being mounted for movement on and with respect to the cam plate.

7. Mechanism as described in claim 6, the motor means being an electric motor rotating an arm received in a horizontal slot in the cam plate, the arm engaging said lock release plate for movement thereof when the cam plate is adjacent its upper position.

8. Mechanism as described in claim 4 including a lock bar mounted for reciprocation adjacent said push rods, solenoid means for moving said lock bar, means on said lock bar for engaging and holding the moved one of said push rods and means on said lock bar for engaging and preventing movement of the others of said push rods.

9. Mechanism as described in claim 8, the motor means being an electric motor and including an electric switch closed by movement of one of said selector links for energizing said solenoid means and the electric motor.

10. Mechanism as described in claim 9 including an actuator bar for actuating said electric switch and engaged and moved by each of said selector links.

References Cited by the Examiner

UNITED STATES PATENTS

| | | |
|---|---|---|
| 947,755 | 1/1910 | Peters et al. |
| 2,323,981 | 7/1943 | Du Gremer et al. _____ 194—10 |
| 3,251,505 | 5/1966 | Johnson et al. ____ 221—125 X |

SAMUEL F. COLEMAN, *Primary Examiner.*